United States Patent [19]
Huffhines et al.

[11] 4,039,127
[45] Aug. 2, 1977

[54] CONTINUOUS PLOTTER

[75] Inventors: Donald F. Huffhines, Richardson; J. S. Jones, Valley View; Clarence G. Smith, Irving, all of Tex.

[73] Assignee: Mobil Oil Corporation, New York, N.Y.

[21] Appl. No.: 656,510

[22] Filed: Feb. 9, 1976

[51] Int. Cl.² .......................................... G01D 15/24
[52] U.S. Cl. .............................. 346/110 R; 318/415; 318/619; 346/136; 346/139 D
[58] Field of Search .............. 346/110 R, 108, 139 D, 346/136, 161; 178/6.7 R, 6.7 A, 7.4; 355/20; 354/6; 242/203; 318/696, 415, 685, 305

[56] References Cited
U.S. PATENT DOCUMENTS

| | | | |
|---|---|---|---|
| 2,976,107 | 3/1961 | Klein et al. | 346/109 |
| 3,203,636 | 8/1965 | Owen | 242/203 |
| 3,373,329 | 3/1968 | Kaiser | 318/305 |
| 3,411,058 | 11/1968 | Madsen et al. | 318/696 |
| 3,434,158 | 3/1969 | Stauffer et al. | 346/110 R |
| 3,465,295 | 9/1969 | Witt et al. | 346/110 R X |
| 3,588,911 | 6/1971 | Luke et al. | 346/110 R X |

*Primary Examiner*—Joseph W. Hartary
*Attorney, Agent, or Firm*—C. A. Huggett; Drude Faulconer

[57] ABSTRACT

An apparatus for plotting information, e.g., seismic data, onto a continuous sheet of a recording medium, e.g., photographic film. The film travels from a supply reel, over an advance roller, across a flat exposure surface, and onto a takeup roller. Torque motors apply equal but opposite torques to the supply reel and the takeup reel to maintain the film in tension to insure that the film will lie flat on the exposure surface during the plotting operation. A stepping motor rotates advance roller to move the film a precise amount across the exposure surface at desired times during the plotting operation. A camera, e.g., cathode ray tube, which receives data and projects it onto the film on the exposure surface, is mounted on a carriage which is swept back and forth across the exposure surface by means of a lead screw driven by a precision stepping motor. Control circuitry means is provided which not only drives the stepping motor and, hence, the carriage at a constant, defined speed during the plotting portion of a sweep but also provides for the proper acceleration and deceleration of the motor during each sweep of the carriage.

9 Claims, 4 Drawing Figures

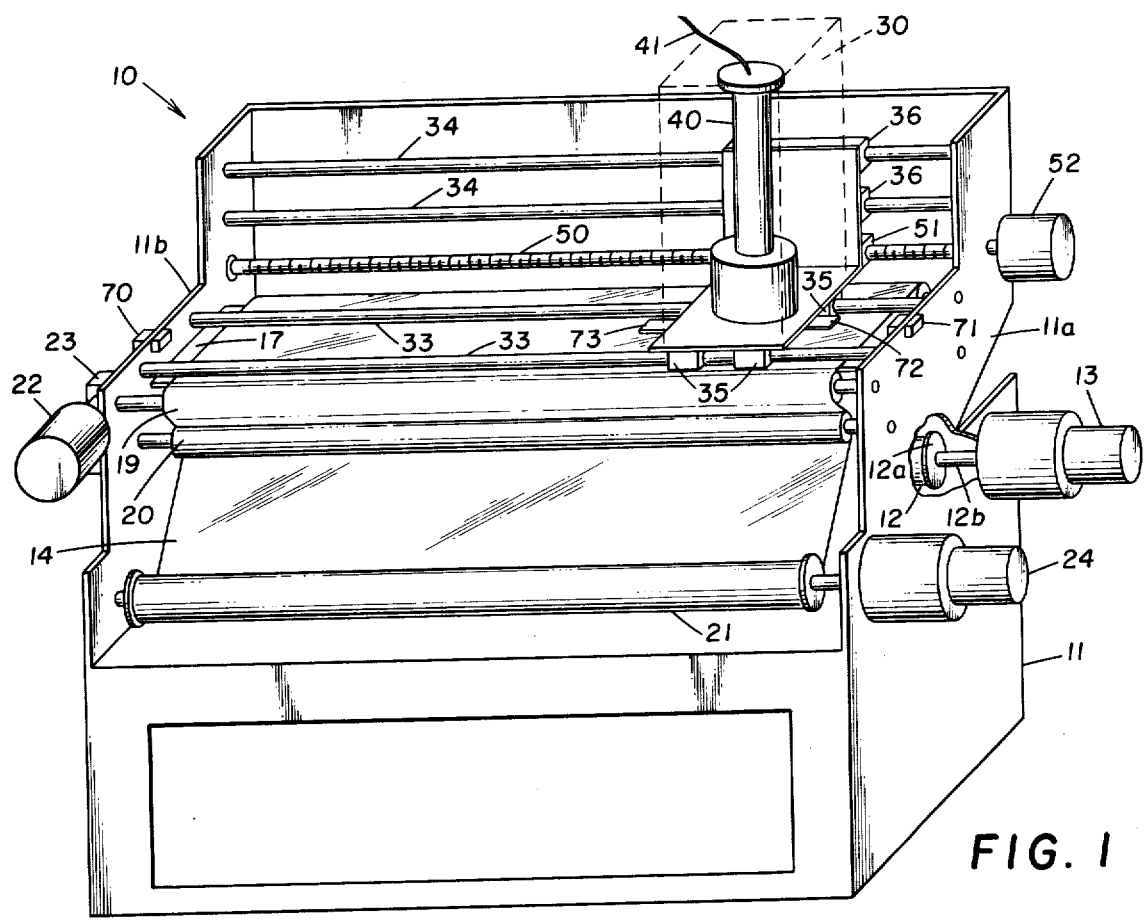
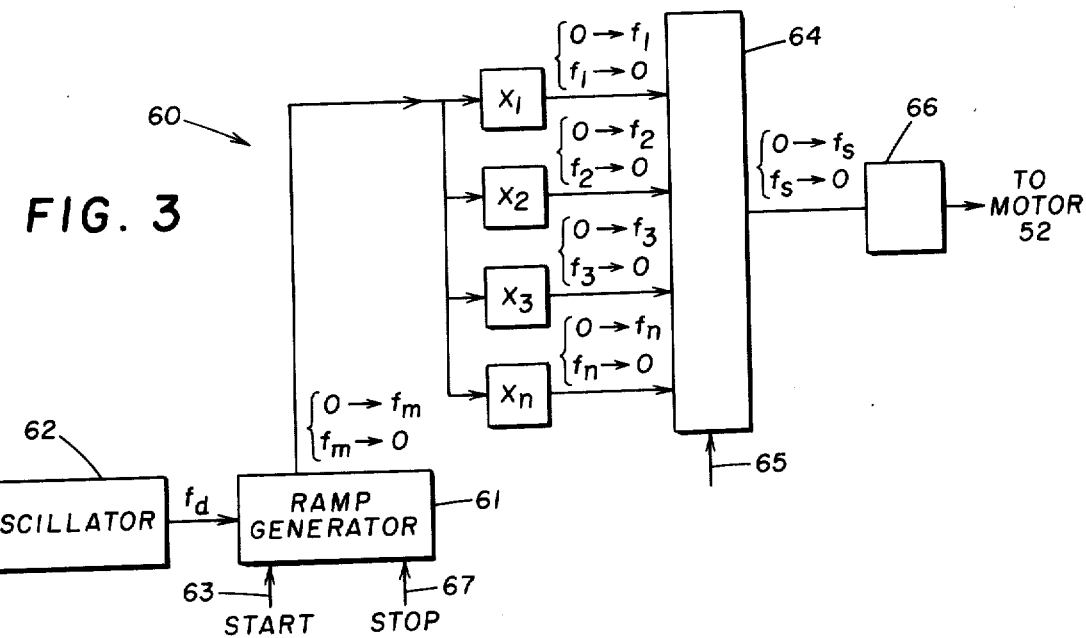
FIG. 1
FIG. 3

CONTINUOUS PLOTTER

BACKGROUND OF THE INVENTION

The present invention relates to an apparatus for plotting information and more particularly relates to an apparatus for plotting information onto a continuous sheet of a recording medium.

Seismic surveys have long been used to search for subterranean minerals, e.g., oil and gas. To conduct such a survey, an impulse from an explosion or the like is generated at an originating point. As the impulse travels downward through the area under investigation, a series of signals is generated as the impulse is reflected off the various subterranean formations. These signals are detected and recorded at a plurality of points by geophones or the like which are spaced at predetermined distances from the originating point. This recorded data is then refined and processed along with data from other originating points and the resulting information is plotted to produce a visual representation called a seismic section.

A seismic section is normally plotted on photographic film or the like and in finished form is comprised of a plurality of common depth point traces positioned in a side-by-side relationship which, when viewed by an analyst, can disclose various characteristics of the area surveyed.

Various types of plotters have been proposed for plotting seismic sections. Probably the most common plotter presently in commercial use is the "drum type" plotter. This plotter uses a standard size sheet of film, e.g., 24 inches (60.96 cm.) by 36 inches (91.44 cm.), which is secured around a rotating cylinder or drum. A camera, e.g., cathode ray tube, is positioned above the drum so that processed data displayed on the face of the tube is optically focused onto the film lying under the camera. The camera is held stationary while the drum is rotated 360°. This permits data to be exposed onto that portion of the film which passes under the camera. The drum then stops and the camera is automatically stepped over so that a new portion of the sheet of film is exposed under the camera. The drum is again rotated and the procedure is repeated until a seismic section is completed or until the camera has been stepped across the operational width of the drum.

When using a drum type plotter, it is not uncommon for some seismic sections to contain too many traces or have too great a spread for the section to be plotted on a single sheet of film. In these instances, the data is recorded on more than one sheet of film and these sheets are spliced together to form the completed section. This procedure, although satisfactory, is time consuming and requires multiple handlings to get a completed section.

Another type of plotter which has been proposed for preparing seismic sections is one where the seismic data is reproduced onto a continuous sheet of film or the like, e.g., see U.S. Pat. Nos. 2,976,107 and 3,588,911. In these continuous type plotters, the camera is mounted on a carriage which sweeps across an area of film which in turn is held stationary under the camera. When a sweep is completed, the film is advanced to expose a new area before another sweep is carried out. This procedure is continued until the seimic section is completed. This permits a section comprised of a large number of traces or having a large spread to be plotted in a single operation without changing or handling multiple sheets of the film.

In plotting seismic sections on a continuous type plotter, several aspects of the plotted must be considered to insure that the processed data is accurately transcribed onto the film so that there will be substantially no error in the finished visual representation of the data. One such aspect involves the precision control of the carriage as it sweeps across the film. Not only must the speed of the carriage be maintained at an exact, constant speed during the actual plotting of data, but, also, the acceleration and deceleration of the carriage as it starts and stops must be taken into account.

Another important aspect involves the proper feeding and positioning of the film as a section is being plotted. The film must be advanced an exact, defined increment before each sweep of the carriage so that the transcribed data does not overlap or have unwanted gaps therein. Also, the film must be fed in such a way that it always lies flat with respect to the camera to avoid distortions which could seriously affect the accuracy of the data on the finished seismic section.

SUMMARY OF THE INVENTION

The present invention provides a continuous plotter for plotting information onto a continuous sheet of reproducing medium, e.g., photographic film. The plotter has an individual, precision drive for both the camera and the film advance and includes control means which provides for the acceleration and deceleration of the camera as it sweeps across the film. Also, means is provided for accurately advancing the film and for maintaining the film in a flat relationship with respect to the camera as the film is being exposed.

Structurally, the plotter is comprised of a base structure having a supply reel and takeup reel journaled thereon. Film from the supply reel is threaded over a flat exposure surface, an advance roller, and onto the takeup reel. Individual torque motors apply opposite but substantially equal torques to said supply and takeup reels, respectively, to keep the film in tension and thereby insure that the film will remain flat across the exposure surface. The torques are such that there is no danger of damage to the film and, being equal but opposite, the torques offer substantially no resistance to the advancement of the film.

A camera, e.g., cathode ray tube, is carried by a carriage which sweeps across the base structure directly over the flat exposure surface. Information, e.g., processed seismic data, from a computer or the like is fed to the camera which, in turn, displays it onto the film lying on the exposure surface as the camera moves thereover. Driving the carriage is a precisioned machined lead screw which is rotated by a precision stepping motor. Control circuitry including a ramp generator controls the stepping motor to provide for the acceleration and deceleration involved in starting and stopping the carriage and to insure that the carriage will move at a constant, defined speed during the actual plotting portion of a sweep.

When the camera has made a sweep and the film on the exposure area has been exposed, a separate precision motor rotates the advance roller to advance the film a desired, exact amount so that a new defined portion of film is moved onto the exposure surface for the camera's next sweep. This procedure is repeated until all the data has been plotted and the seismic section is completed.

BRIEF DESCRIPTION OF THE DRAWINGS

The actual construction, operation, and the apparent advantages of the invention will be better understood by referring to the drawings in which like numerals identify like parts and in which:

FIG. 1 is a perspective, partly in section, of the continuous plotter in accordance with the present invention;

FIG. 3 is a block diagram of the circuitry for controlling the carriage drive of the plotter of FIG. 1.

DESCRIPTION OF THE PREFERRED EMBODIMENT

Figure 2:
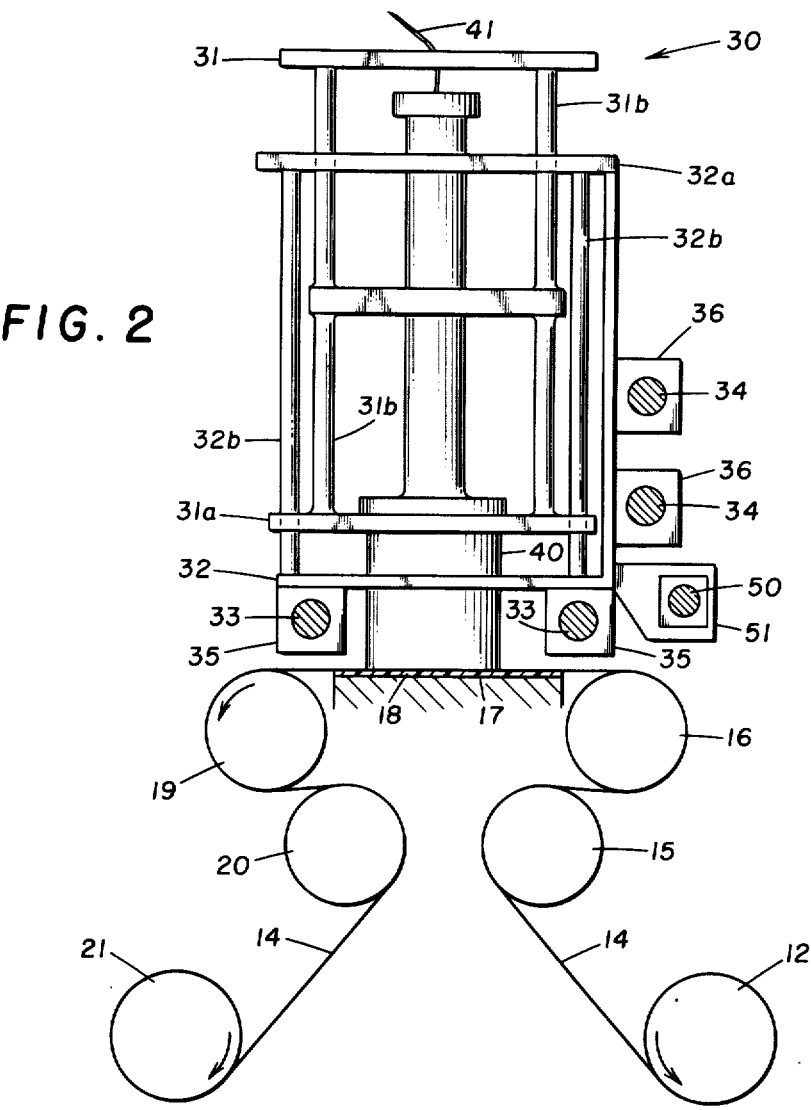
FIG. 2 is a partially schematic view of the camera carriage and the film feed for the plotter of FIG. 1.

Referring more particularly to the drawings, FIG. 1 discloses a continuous plotter 10 capable of recording information, e.g., seismic data, from a processing source (not shown) onto a continuous sheet of reproducing medium or material 14, e.g., photographic film, to produce a visual reproduction of such information, e.g., a seismic section. Plotter 10 has a base structure 11 on which supply reel 12 is journaled. Supply reel 12 is preferably a commercially available roll of film which can be mounted in base 11 by means of removable adapters 12a which cooperate with either end of the commercial roll. This eliminates the time consuming and unnecessary task of transferring film from its commercial package onto a separate reel. One end of supply reel 12 is drivably connected to torque motor 13 for a purpose to be described below.

As best shown in FIG. 2, film 14 from supply reel 12 is threaded around idler rollers 15 and 16 and over flat, exposure surface 17 which in turn is covered with a strip of a relatively soft, compliant material 18. e.g., three-sixteenths of an inch of neoprene foam, for a purpose explained below. Film 14 then continues over advance roller 19, idler roller 20, and onto takeup reel 21. Advance roller 19 is driven by motor 22 (FIG. 1), preferably of the stepping type, as will be more fully discussed below, through a worm gear transmission 23. Takeup reel 21 is drivably connected to torque motor 24. The purpose of torque motors 13 and 24 will be fully explained in the description of operation set out below. Reel 21 is readily removable so that when a desired length of exposed film has been rolled thereon, it can be easily removed as a unit for developing or other handling and an empty reel can easily be installed onto base structure 11.

Carriage 30 (shown in dotted lines in FIG. 1 and in more detail in FIG. 2) is movably mounted on base structure 11 and is adapted to move across base structure 11 over exposure surface 17. Carriage 30 is preferably comprised of inner frame 31 and outer frame 32. Openings (not shown) are provided in brace members 31a and 32a to slidably receive frame members 32b and 31b, respectively, whereby inner frame 31 may be moved up and down with respect to outer frame 32 for a purpose explained below.

Outer frame 32 is slidably mounted on guide rods 33 and stabilizing rods 34 by means of bushings 35 and 36, respectively. Both guide rods 33 and stabilizing rods 34 extend between the end supports 11a and 11b of base structure 11. Stabilizing rods 34 insure that carriage 30 will not wobble as it travels along exposure surface 17 since any such wobble could seriously distort the factual representation of the data being exposed onto film 14.

Mounted on inner frame 31 is electronic camera 40 which receives data from a processing source, e.g., digital computer (not shown) by means of lead 41. Preferably, camera 40 is a cathode-ray tube (CRT) having fiber-optics included into the tube's faceplate so that data presented on the face of the CRT will be properly focused with respect to film 14. This type of CRT is well known in the art and is available commercially, e.g., Type 5M-41p-MFO, made by Thomas Electronics, Inc. of Wayne, New Jersey. The electronics (not shown) for supplying data from a processing source to a CRT in a desired, programmed sequence is also well known in the art, see U.S. Pat. No. 3,714,663 to Clarence G. Smith. Due to the ability of inner frame 31 to move with relation to outer frame 32, CRT 40 can easily be moved into and out of contact with film 14 for maintenance, replacement, or the like.

The speed at which carriage 30 traverses or sweeps across exposure surface 17 must be accurately controlled with respect to the rate at which processed data is supplied to CRT 40 so that the data will be properly and timely exposed onto film 14. Chain or belt drives have been proposed to drive the carriages of prior art plotters of this type but due to the acceleration and deceleration forces involved in starting and stopping the carriage, it is sometimes difficult to properly control the speed and the timing of the carriage with the degree of accuracy required.

In the present invention, carriage 30 is driven across exposure surface 17 by means of lead screw 50 which cooperates with ball nut 51 on outer frame 32 of carriage 30. Lead screw 50 is precision machined so that each complete rotation of screw 50 will advance carriage 30 a precise distance, e.g., 1 inch (2.54 cm) of travel for each 360° revolution of screw 50. Driving lead screw 50 is high precision, reversible, stepping motor 52 which rotates an exact, constantly defined amount each time said motor 52 receives a pulse, e.g., 1.8° per pulse or 200 pulses per revolution. This type of stepping motor is well known and is commercially available, e.g., Slo-Syn, Model M111-FD16, manufactured by Superior Electric, Bristol, Connecticut.

The circuitry for controlling motor 52 must not only be capable of maintaining carriage 30 at an exact constant speed during the plotting portion of a sweep but must also be capable of "gradually" accelerating and decelerating motor 52 and, hence, carriage 30 in both its forward and reverse directions in order to avoid possible damage to camera 40 due to the substantial gravitational forces involved. Also, a gradual acceleration of motor 52 is a practical necessity due to the natural inertia of lead screw 50. Of course, the term "gradual" is used herein as a relative term and it will become evident from the following discussion that both the acceleration and deceleration of motor 52 are in fact extremely rapid in real time.

Referring now to FIG. 3, control circuitry 60 for motor 52 is comprised of a digital ramp generator 61 to which a constant, accurately defined frequency $f_d$ from precision square-wave oscillator 62, e.g., a crystal clock oscillator, is applied. Upon receiving a "start" signal through line 63, generator 61 acts on the defined frequency $f_d$ to generate a precision, linearly increasing output frequency which increases from 0 to a maximum set frequency $f_m$. This output frequency from generator 61 is simultaneously fed to a plurality of frequency dividers $X_1, X_2, X_3 \ldots X_n$, which in turn output individual, discrete linearly increasing frequencies which increase from 0 to $f_1$, 0 to $f_2$, 0 to $f_3$, and 0 to $f_n$, respectively, as the output from generator 61 increases from 0 to $f_m$. These discrete frequencies $f_1, f_2, f_3, f_n$ represent the actual frequencies required to drive motor 52 at different, desired constant speeds to thereby insure that carriage 30 is maintained at a constant, defined speed during the actual plotting of data.

The discrete frequency outputs of dividers $X_1, X_2, X_3, X_n$ are all fed to selector switch means 64. A selector code is applied to switch means 64 via line 65 to acutally select the frequency $f_s$, e.g., $f_2$, which is to be used for a particular plotting operation. The selected frequency $f_s$, which linearly increases from 0 to $f_s$, as the output from generator 61 increases from 0 to $f_m$, is supplied to drive circuitry 66 for motor 52. As can be seen from the above description, upon generator 61 receiving a start signal, the frequency signal driving motor 52 begins at 0 and gradually builds to the desired value $f_s$. This linear increase of the frequency signal, in turn, causes motor 52 to accelerate from 0 to the maximum speed produced by $f_s$. The actual time allowed for acceleration is based on engineering considerations derived from the starting torque curves of motor 52, the actual inertia of lead screw 50, and the amount of acceleration forces which can be withstood by camera 40 without damage thereto. However, this time must be short enough so that carriage 30 moves only a short distance before it is up to full speed. This allows most of film 14 to be used for plotting data with only a small margin being required on either side of the plot for acceleration and deceleration of carriage 30. A more detailed example will be given below.

It should be understood that circuitry 60 accelerates motor 52 in the same manner every time a start signal is applied to ramp generator 61, regardless of whether motor 52 is rotating lead screw 50 in a first direction to advance carriage 30 or is rotating lead screw 50 in an opposite direction to return carriage 30 to its initial position. As is well known in the art, the direction in which stepping motor 52 rotates is determined by drive circuitry 66 which, upon a signal, reverses the order in which the frequency signal is being phased to the motor and thereby reverses the rotational direction of the motor.

At the end of the plotting portion of a sweep, a stop signal is applied to ramp generator 61 through line 67 and a reverse of the frequency buildup occurs to gradually decelerate carriage 30. Generator 61 acts on defined frequency $f_d$ to output a linearly decreasing frequency which decreases from $f_m$ to 0. This causes signals from dividers $X_1, X_2, X_3, \ldots, X_n$ to decrease, respectively, from $f_1$ to 0, $f_2$ to 0, $f_3$ to 0, $\ldots f_n$ to 0. Accordingly, since one of these frequencies $f_s$ is being applied to motor 52 through switch means 64 and drive circuitry 66, as the selected frequency $f_s$ decreases, the speed of motor 52 will correspondingly decrease thereby bringing carriage 30 to a gradual stop. Again, this is true regardless of the direction in which carriage 30 is being moved.

Figure 4:
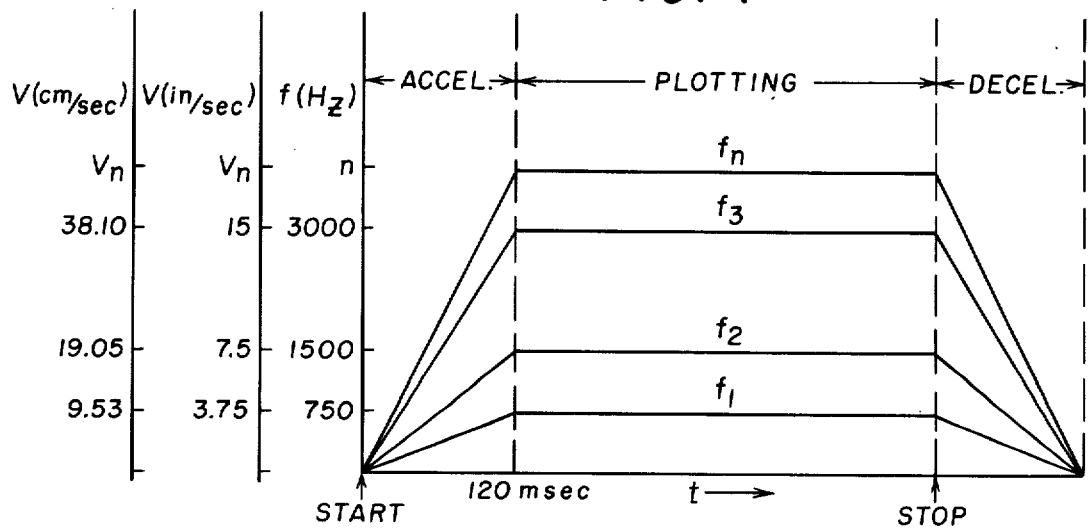
FIG. 4 is a graphic representation of the outputs of frequency dividers $X_1$, $X_2$, $X_3$, $X_n$ of FIG. 3 wherein the frequencies are plotted as a function of time.

To further elucidate the operation of circuitry 60, the following example is given. A precision signal $f_d$ of 512 KHz is applied to digital ramp generator 61 by means of crystal clock 62. Upon receiving a start signal, generator acts on $f_d$ to output a linearly increasing precision signal that increases from 0 to 240 KHz. This signal is simultaneously fed to frequency dividers $X_1, X_2, X_3, \ldots X_n$ which simultaneously output respective increasing frequency signals, e.g., 0 to 750 Hz, 0 to 1500 Hz, 0 to 3000 Hz, $\ldots$ 0 to $f_n$. As shown by the graph in FIG. 4, all of the frequencies increase from 0 to their respective maximum values in the same, relative short times of 120 milliseconds and accordingly carriage 30 would be up to desired velocity in a relatively short distance, e.g., less than 1 inch of travel for even the fastest speed. These signals are all supplied to selector switch means 64. A selector code is applied to switch means through line 65 to select the particular frequency desired for a particular plotting operation, e.g., $f_s = f_2 = 1500$ Hz. This frequency is applied to drive circuitry 66 which in turn accelerated motor 52 from 0 to the maximum speed corresponding to the maximum signal of 1500 Hz, i.e., 7.5 inches per second where motor 52 makes one revolution for each 200 pulses and lead screw 50 advances carriage 30 1 inch (2.54 cm) per revolution. The motor 52 will continue to be driven at the exact constant speed, e.g., 7.5 inches per second (19.05 cm per second) until a programmed "stop" signal is received by ramp generator 61. The generator 61 then outputs a signal which linearly decreases from 240 KHz to 0. This, in turn, causes $f_s$ to decrease from 1500 Hz to 0, providing a gradual deceleration of motor 52 which brings carriage 30 to a gradual stop.

A programmed signal is supplied to drive circuitry 66 to reverse the phasing of the frequency signal to motor 52 so that when a second programmed start signal is received by ramp generator, the above procedure is repeated except now motor 52 is driven in the opposite direction to return carriage 30 to its initial position. A second programmed stop signal to generator 61 will likewise decelerate carriage 30 at the end of its reverse travel.

By providing a plurality of precision frequency signals, $f_1, f_2, f_3, \ldots f_n$ to selector switch means 64, it is possible for an operator to select any one of various speeds at which he wants the data to be plotted. This allows the data comprising the individual common depth point traces to be "stretched" or "condensed" so that a particular seismic section can be plotted to fit the needs or desires of a particular analyst.

Now that the control circuitry 60 has been explained, the complete operation of continuous plotter 10 will be described. Film 14 from supply reel 12 is threaded over idler rollers 15, 16, exposure surface 17, film advance roller 19, idler roller 20, and onto takeup roller 21. Torque motor 13 is actuated so that a constant counter-clockwise torque (as viewed in FIG. 2) is applied to supply reel 12. Torque motor 24 applies a substantially equal but opposite (clockwise as viewed in FIG. 2) torque to takeup reel 21. These opposite but substantially equal torques put film 14 in tension between supply reel 12 and takeup reel 21, and insure that it will lie flat across exposure surface 17. Of course, the torques applied are relatively small so that there is no danger of damaging film 14. Also, since the torques are substantially equal and in opposite directions, neither offers any real resistance to the advancement of film 14 when advance roller 19 is actuated.

Inner frame 31 of carriage 30 is moved downward with respect to outer frame 32 to position faceplate of CRT 40 into direct contact with film 14 on exposure surface 17. The slight resilience of compliant material 18 allows CRT 40 to move across surface 17 in direct contact with film 14 without damaging either film 14 or CRT 40.

Stepping motor 52 is actuated through circuitry 60 to rotate lead screw 50 at a desired rate to move carriage 30 and hence camera 40 across exposure surface 17 at a selected speed as explained above. As explained above, circuitry 60 provides for proper acceleration of carriage 30 so that CRT 40 is not damaged. Data is fed to camera 40 in the proper programmed sequence and is exposed onto film 14 as camera 40 passes thereover during the constant speed portion of the sweep of carriage 30. At the end of the designated plotting portion of the sweep, the feed of data to CRT 40 is ceased and a signal from the programmed data is supplied to generator 61 in circuitry 60 for the proper deceleration of carriage 30. As a safety precaution, limit switches 70, 71, e.g., photo-electric cells (FIG. 1), are positioned at either end of base structure 11. If, for any reason, a stop signal is not given to generator 61 before switches 70, 71 sense reflective surfaces on arms 72, 73, respectively, which extend from either side of carriage 30, the respective limit switch will relay a stop signal to ramp generator 61 to decelerate and stop motor 52, thereby insuring that carriage 30 will never slam into base structure 11 and seriously damage CRT 40 and related electronics.

After carriage 30 comes to rest, a programmed signal is applied to drive circuitry 66 to reverse motor 52 and a start signal to generator 61 now causes motor 52 to rotate screw 50 in the opposite direction to return carriage 30 to its original position. As carriage 30 is being returned, a programmed signal operates stepping motor 22 to rotate advance roller 19 through worm gear transmission 23. By using a precision stepping motor and properly designed transmission 23 to drive advance roller 19, film 14 is always advanced the exact distance required.

For example, in plotting a seismic section where 24 common depth point traces are being displayed on the faceplate of CRT 40 and hence are being plotted simultaneously by each sweep of camera 40, film 14 will be advanced according to the "spread" desired between races. This spread is normally referred to as "traces per inch" and commonly is based on multiples of 8 traces per inch. Therefore, if the 24 traces being displayed on CRT 40 are to be spread 8 traces per inch, film 14 will have to be advanced exactly 3 inches. If the spread is to be 16 traces per inch, the film advance will have to be exactly 1.5 inches. If the spread is 24 traces per inch, the film advance is exactly 1 inch, etc.

In order to allow for the different advances and to insure that each advance is exact, worm gear transmission 23 is designed to rotate roller 19 to advance film 14 exactly 1/576th of an inch for each pulse applied to stepping motor 22. This particular fraction of an inch is selected since the denominator is divisible by multiples of 8 and 12 throughout the film advance ranges of interest. For example, if the 24 traces displayed on CRT 40 are to be spread 8 traces per inch, motor 22 would have to receive exactly 576 pulses per inch times 3 inches or exactly 1728 pulses to properly advance film 14 for that particular plotting operation.

From the above description, it can be seen that the continuous plotter is capable of varying the speed at which information is plotted onto a sheet of recording medium by providing a plurality of precise frequency signals, each of which will drive the carriage carrying the camera at a precise speed. Also, the plotter compensates for both the acceleration and deceleration forces inherently present in the starting and stopping of the carriage. Further, the recording medium is fed and positioned with the accuracy required for the plotting of delicate information such as the described seismic sections. It should be realized that although the present plotter has been described in relation to the plotting of seismic sections, other information could be plotted equally as well, e.g., maps, graphs, charts, etc.

What is claimed is:

1. Apparatus for plotting information comprising:
   a base structure;
   means for mounting a supply reel of recording medium on said base structure;
   means for mounting a takeup reel on said base structure;
   an exposure surface positioned on said base structure so that recording medium passing from said supply reel to said takeup reel will lie substantially flat on said exposure surface;
   means adapted to advance said recording medium across said exposure surface;
   a carriage movably mounted on said base structure and adapted to move back and forth across said exposure surface;
   a means carried by said carriage and adapted to receive information from an information source and to project said information onto said exposure surface; and
   means to drive said carriage back and forth across said exposure surface at a controlled rate, said drive means comprising:
      a lead screw extending along the length of said exposure surface;
      means on said carriage in cooperation with said lead screw; and
      motor means coupled to said lead screw for rotating said lead screw to move said carriage, said motor means comprising:
         a stepping motor which rotates an exact increment each time said motor receives a pulse of a frequency signal; and
         control circuitry means for supplying a precise frequency signal of desired value to said stepping motor for driving said motor at a desired speed, said control circuitry means including:
            means for gradually increasing said precise frequency signal from 0 to a maximum value upon receiving a start signal to accelerate said motor to said desired speed; and
            means for gradually decreasing said precise frequency signal from said maximum value to 0 upon receiving a stop signal to decelerate said motor from said desired speed to a stopped position.

2. The plotting apparatus of claim 1 wherein said control circuitry means includes:
   a ramp generator adapted to receive a precise, constant frequency and upon receiving a start signal to output a precise, linearly increasing frequency signal which increases from 0 to a maximum frequency, said generator adapted to continue to output said maximum frequency until it receives a stop signal, said generator adapted to then output a linearly, decreasing frequency signal decreasing from said maximum frequency to 0;
   a plurality of frequency dividers, each of said dividers adapted to simultaneously receive said output signal from said ramp generator and output an individual, discrete frequency signal which (a) linearly increases from 0 to a precise, constant frequency value as the output signal from said generator increases, (b) remains at said precise, constant frequency as said output signal of said generator remains constant, and (c) linearly decreases from said precise, constant frequency to 0 as said output signal from said generator decreases; and means to apply any one of said precise, discrete output signals from said frequency dividers to said stepping motor.

3. The plotting apparatus of claim 2 wherein said control circuitry means further includes:

a square-wave oscillator means for supplying said precise, constant frequency signal to said ramp generator.

4. The plotting apparatus of claim 3 including:

a first torque motor coupled to said supply reel and adapted to apply a torque to said supply reel in a first direction; and a second torque motor coupled to said takeup reel and adapted to apply a substantial equal but opposite torque to said takeup reel whereby recording medium passing from said supply reel to said takeup reel will be maintained in tension.

5. The plotting apparatus of claim 4 wherein said means for advancing said recording medium includes:

a roller on said base structure over which said recording medium passes as said medium travels from said supply reel to said takeup reel; and means to rotate said roller to advance said recording medium in contact with said roller.

6. The plotting apparatus of claim 5 wherein said means to rotate said roller comprises:

a stepping motor which rotates an exact increment each time said motor receives a pulse of a frequency signal.

7. The plotting apparatus of claim 6 wherein said means for projecting information comprises:

a cathode ray tube.

8. The plotting apparatus of claim 7 including:

a strip of relatively soft, compliant material covering said exposure surface.

9. The plotting apparatus of claim 8 including:

a fiber-optic faceplate on said cathode ray tube; and means for positioning said fiber-optic faceplate on said cathode ray tube into direct contact with recording medium on said compliant material on said exposure surface.

* * * * *